(12) United States Patent
Ishikawa (10) Patent No.: US 7,502,710 B2
(45) Date of Patent: Mar. 10, 2009

(54) TEMPERATURE DETECTION CIRCUIT

(75) Inventor: Toru Ishikawa, Tokyo (JP)

(73) Assignee: Elpida Memory, Inc., Tokyo (JP)

( * ) Notice: Subject to any disclaimer, the term of this patent is extended or adjusted under 35 U.S.C. 154(b) by 48 days.

(21) Appl. No.: 11/709,191

(22) Filed: Feb. 22, 2007

(65) Prior Publication Data

US 2007/0203664 A1    Aug. 30, 2007

(30) Foreign Application Priority Data

Feb. 24, 2006 (JP) .............................. 2006-048104

(51) Int. Cl.
*G01K 11/00* (2006.01)
*G01K 7/00* (2006.01)
(52) U.S. Cl. ..................................................... 702/130
(58) Field of Classification Search .................. 702/130, 702/132, 133
See application file for complete search history.

(56) References Cited

U.S. PATENT DOCUMENTS

| | | | |
|---|---|---|---|
| 7,084,695 B2* | 8/2006 | Porter | 327/512 |
| 7,242,339 B1* | 7/2007 | Truong et al. | 341/154 |
| 7,248,526 B2* | 7/2007 | Ito et al. | 365/222 |
| 2007/0041425 A1* | 2/2007 | Lee et al. | 374/208 |
| 2007/0171956 A1* | 7/2007 | Noguchi | 374/100 |

FOREIGN PATENT DOCUMENTS

JP    2003-108241    4/2003

* cited by examiner

*Primary Examiner*—Michael P Nghiem
(74) *Attorney, Agent, or Firm*—McGinn IP Law Group, PLLC (57) ABSTRACT

First and second reference-potential generator units output first and second reference potentials V1 and V7, respectively, which correspond to first and second specific temperatures to be detected. An intermediate-potentials generator unit divides the potential difference between the reference potential V1 and the reference potential V7 to output intermediate potentials through nodes N2 to N6. A temperature-dependant-potential generator unit outputs the forward voltage drop of a diode which varies depending on the ambient temperature. A comparator compares one of the potentials of nodes N1 to N7 selected by a selector against the potential output by the temperature-dependant-potential generator unit and outputs the result of the comparison indicating the range of the ambient temperature.

21 Claims, 8 Drawing Sheets

PRIOR ART

FIG. 8
PRIOR ART

TEMPERATURE DETECTION CIRCUIT

BACKGROUND OF THE INVENTION

1. Field of the Invention

The present invention relates to a temperature detection circuit and, more particularly, to a temperature detection circuit for detecting whether or not a detected temperature has exceeded a predetermined specific temperature by using the temperature coefficient of the forward voltage drop of a diode. The present invention also relates to a semiconductor device having such a temperature detection circuit.

2. Description of the Related Art

Figure 7:
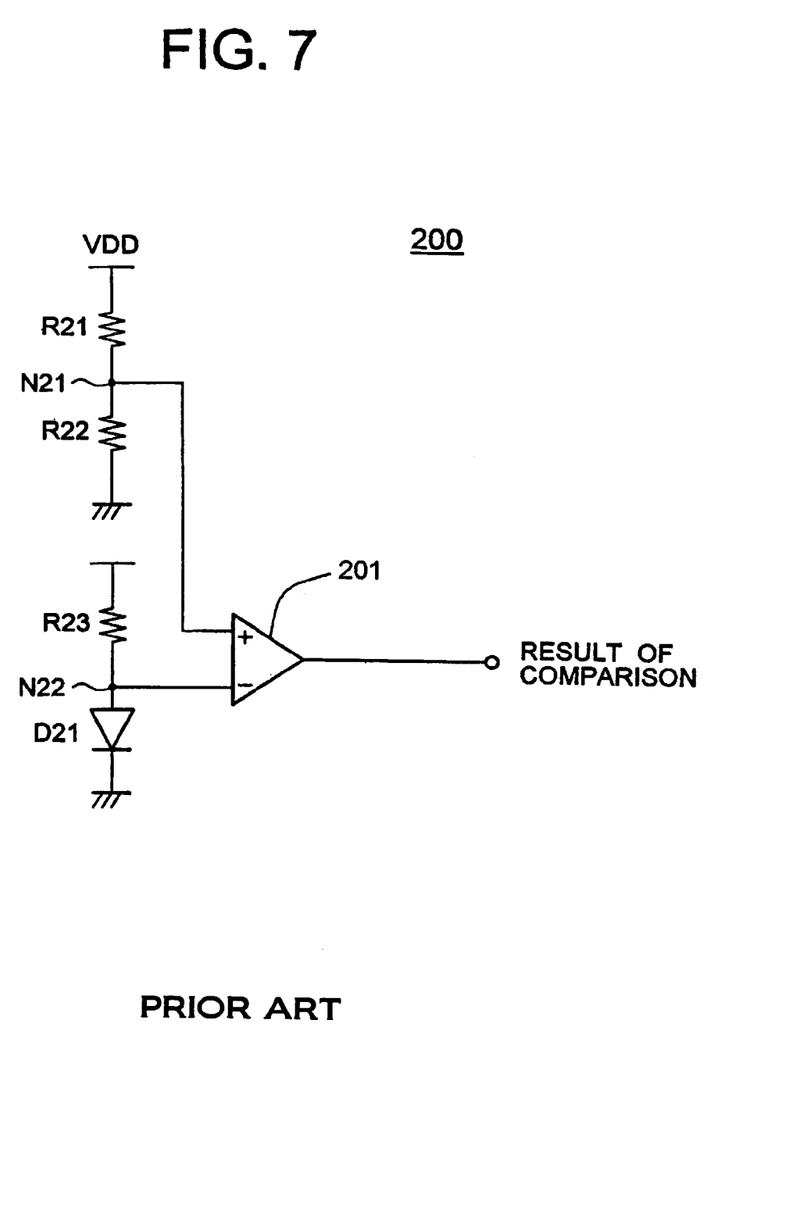
FIG. 7 is a circuit diagram showing a conventional temperature detection circuit.

A semiconductor device provided with a temperature detection circuit is known in the art. FIG. 7 shows the configuration of a conventional temperature detection circuit used in a semiconductor device. The temperature detection circuit, generally designated at numeral 200, includes a comparator 201, resistors R21 to R23 and a diode D21. The resistors R21 and R22 are connected in series between a high-potential power source line, to which a constant voltage is supplied from a constant voltage source, and a low-potential power source line configuring a ground line. The resistor R23 and the diode D21 are connected in series between the high-potential power source line and the low-potential power source line, with the diode D21 being forward biased. One of the input terminals, non-inverting terminal, of the comparator 201 is connected to a node N21 connecting the resistors R21 and R22 in series, and the other of the input terminals, inverting terminal, thereof is connected to a node N22 connecting together the resistor R23 and the anode of the diode D21.

The forward voltage drop of the diode D21 has a negative temperature coefficient, and the potential of the node N22 connected to the inverting input terminal of the comparator 201 is lowered with a rise of the ambient temperature. On the other hand, the voltage of the node N21 connected to the non-inverting input terminal of the comparator 201 is generated by a resistive voltage divider dividing the potential difference between the high-potential voltage and the low-potential voltage by the resistors R21 and R22, and is a constant voltage independent of the ambient temperature. For example, if the temperature to be detected is 90 degrees C., resistance ratio between the resistors R21 and R22 is adjusted so that the potential of the node N21 is as high as the potential of the node N22 at a temperature of 90 degrees C. In this case, by detecting whether the potential of the node N22, which varies depending on the ambient temperature, is higher or lower than the potential of the node N21, which is independent of the ambient temperature, it is detected whether the ambient temperature is higher or lower than 90 degrees C.

Figure 8:
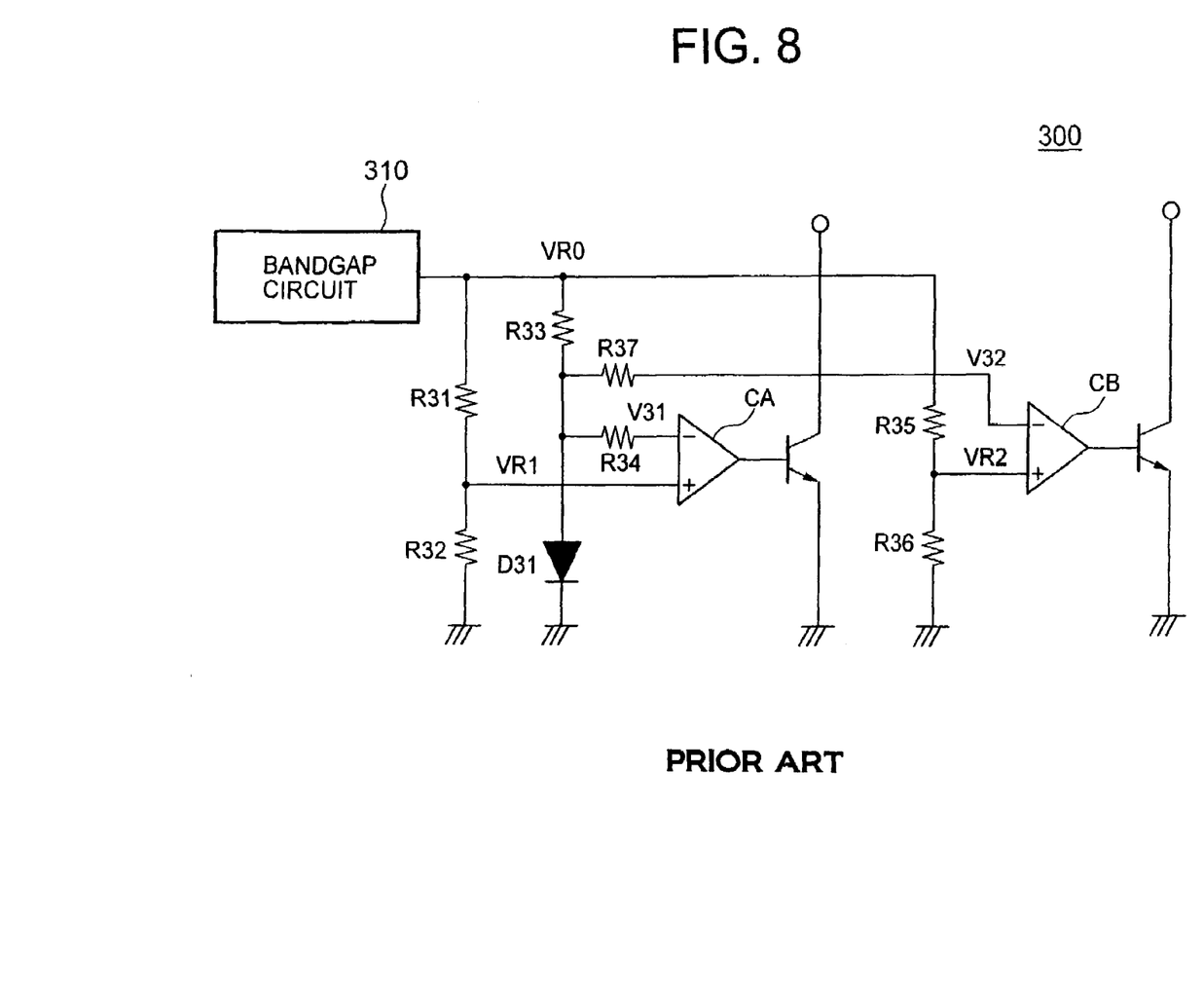
FIG. 8 is a circuit diagram showing the configuration of a temperature detection circuit described in the patent publication.

A conventional technique for detecting two and more temperatures by using a temperature detection circuit is described in Patent Publication JP-A-2003-108241A. FIG. 8 shows the configuration of the temperature detection circuit described in the patent publication. The temperature detection circuit, generally designated at numeral 300, includes a first comparator CA and a second comparator CB. A resistor R33 and a diode D31 are connected in series between a power source line having reference voltage VR0 output from a bandgap circuit 310 and the ground line. The node connecting together the resistor R33 and the anode of the diode D31 is connected to the inverting input terminal of the first comparator CA via a resistor R34. Further, the node connecting together the resistor R33 and the anode of the diode D31 is connected to the inverting input terminal of the second comparator CB via a resistor R37.

A reference voltage VR1 generated by a resistive voltage divider dividing the reference voltage VR0 by the resistors R31 and R32 is input to the non-inverting input terminal of the first comparator CA. Further, a reference voltage VR2 generated by a resistive voltage divider dividing the reference voltage VR0 by resistors R35 and R36 is input to the non-inverting input terminal of the second comparator CB. These reference voltages VR1 and VR2 have respective constant voltages independent of the ambient temperature. On the contrary, potential V31 of the node connecting together the diode D31 and the resistor R33, input to the inverting input terminal of the first comparator CA, varies depending on the ambient temperature, and potential V32 of the node connecting together the diode D31 and the resistor R33, input to the inverting input terminal of the second comparator CB, varies depending on the ambient temperature.

The reference voltage VR1 generated by the resistors R31 and R32 corresponds to the potential V31 of the node connecting the diode D31 and the resistor R33 at a first specific operating temperature, and if the operating temperature of the semiconductor device exceeds the first specific temperature, the output of the first comparator CA is inverted. Further, the reference voltage VR2 generated by the resistors R35 and R36 corresponds to the potential V32 of the node connecting the diode D31 and the resistor R33 at a second specific operating temperature, and if the operating temperature exceeds the second specific temperature, the output of the second comparator CB is inverted.

In the above-described patent publication, it is described that the second specific temperature is set at 130 degrees C. which is the guaranteed temperature for a suitable operation of the semiconductor-integrated circuit, and that the first specific temperature is set at 100 degrees C. which is slightly lower than the second specific temperature. Further, it is also described that when a microcomputer that controls the semiconductor-integrated circuit detects that the operating temperature exceeds the first specific temperature based on the output of the first comparator CA, the control unit judges that the operating temperature of the semiconductor-integrated circuit comes close to the upper limit of the guaranteed temperature range for a suitable operation, and thus, carries out a variety of processings such as transition of the operational mode of the semiconductor-integrated circuit into a power save mode.

In the temperature detection circuit 200 shown in FIG. 7, it is difficult to accurately predict, by calculations, the potential of the node N22 at which the output of the comparator 201 is inverted at a desired specific temperature, because the forward voltage drop of the product diode D21 varies due to the process conditions of the semiconductor-integrated circuit. Further, there is also a significant range of variation in the offset voltage of the comparator 201. Thus, if the resistance ratio between the resistors R21 and R22 defining the potential of the node N21 is set based on the potential of the node N22 obtained by calculations, there is a problem in that the accuracy of temperature detection is lowered due to a significant error caused by the range of variation.

In order to avoid the problem as described above and to thereby improve the accuracy of temperature detection, the resistance ratio between the resistors R21 and R22 of the resistive voltage divider is usually adjusted with the ambient temperature being maintained at the desired specific temperature. More specifically, for example, the resistor R21 is configured by a programmable resistor, the temperature detection circuit 200 is operated with the ambient temperature being maintained at the desired specific temperature, and the resistance of the resistor R21 is adjusted by using a fuse-cut technique so that the output of the comparator 201 is inverted exactly at the desired specific ambient temperature. In this manner, influences of the range of variation in the forward voltage drop of the diode D21 and the offset voltage of the comparator 201 can be avoided, to thereby improve the accuracy of the temperature detection.

If only one specific temperature is to be detected by the temperature detection circuit, the process of adjustment of resistance ratio is needed only once. However, if there are a plurality of desired specific temperatures, as in the case of the temperature detection circuit 300 shown in FIG. 8, resistance ratio must be adjusted at each of the desired specific temperatures. More concretely, in the temperature detection circuit 300, resistance ratio between the resistors R31 and R32 for detecting the first specific temperature is needed to be adjusted with the ambient temperature being maintained at the first specific temperature, and the resistance ratio between the resistors R35 and R36 for detecting the second specific temperature is needed to be adjusted with the ambient temperature being maintained at the second specific temperature.

Usually, in typical semiconductor devices, an environmental test is carried out as the wafer test at the upper limit of the guaranteed temperature range for a suitable operation, to thereby determine pass or fail of the products. If it is desired to detect the upper limit of the guaranteed temperature range for a suitable operation by using the temperature detection circuit, the upper limit can be detected by varying the resistance ratio between the resistors for detecting the upper limit of the guaranteed temperature range in the wafer test. However, if it is desired to detect the specific temperature, which is 100 degrees C. in the case of the above-described patent publication and slightly lower the upper limit temperature 130 degrees C., in addition to the upper limit temperature, the adjustment of the resistance ratio at 100 degrees C. is needed in addition to the adjustment thereof at 130 degrees C. In this case, there is a problem in that the productivity rate of the semiconductor devices is lowered because the adjustment of the resistance ratio at the temperature of 100 degrees C., which is not originally intended for the wafer test, is additionally needed.

In recent years, development of the semiconductor devices has been directed to multiple and diversified functions of the semiconductor devices, and the number of specific temperatures desired to be detected by the temperature detection circuit is increasing. Thus, in the temperature detection circuit, the resistance ratio between the resistors should be adjusted in a plurality of steps corresponding to the increased number of the specific temperatures to be detected. Accordingly, there arises a problem in that the productivity rate of semiconductor devices is lowered by using the conventional temperature detection circuit, because the number of adjustments for the resistance ratio therein is increased along with the increasing number of the desired specific temperatures.

SUMMARY OF THE INVENTION

It is an object of the present invention to solve the problems encountered in the conventional temperature detection circuit, and to provide a temperature detection circuit capable of detecting a plurality of specific temperatures accurately without lowering the productivity rate of semiconductor devices and substantially without increasing the circuit scale of the temperature detection circuit.

It is another object of the present invention to provide a semiconductor device including such a temperature detection circuit.

The present invention provides a temperature detection circuit including: a temperature-dependent potential generator for generating a temperature-dependent potential which varies depending on an ambient temperature; a first reference-potential generator for generating a first reference potential; a second reference-potential generator for generating a second reference potential; an intermediate-potential generator for generating at least one intermediate potential between the first reference potential and the second reference potential; a selector for selecting one of the first reference potential, second reference potential and intermediate potential to output a selected potential; and a comparator for comparing the temperature-dependent potential against the selected potential to output a comparison result indicating a temperature level of the ambient temperature.

In accordance with the temperature detection circuit of the present invention, the adjustment of the first and second reference potentials allows the intermediate potential of the intermediate-potential generator to be adjusted without supplying the intermediate potentials to the comparator or without maintaining the temperature detection circuit at the intermediate potential.

The above and other objects, features and advantages of the present invention will be more apparent from the following description, or for selecting one of the first reference potential, second reference referring to the accompanying drawings.

DETAILED DESCRIPTION OF THE PREFERRED EMBODIMENTS

Figure 1:
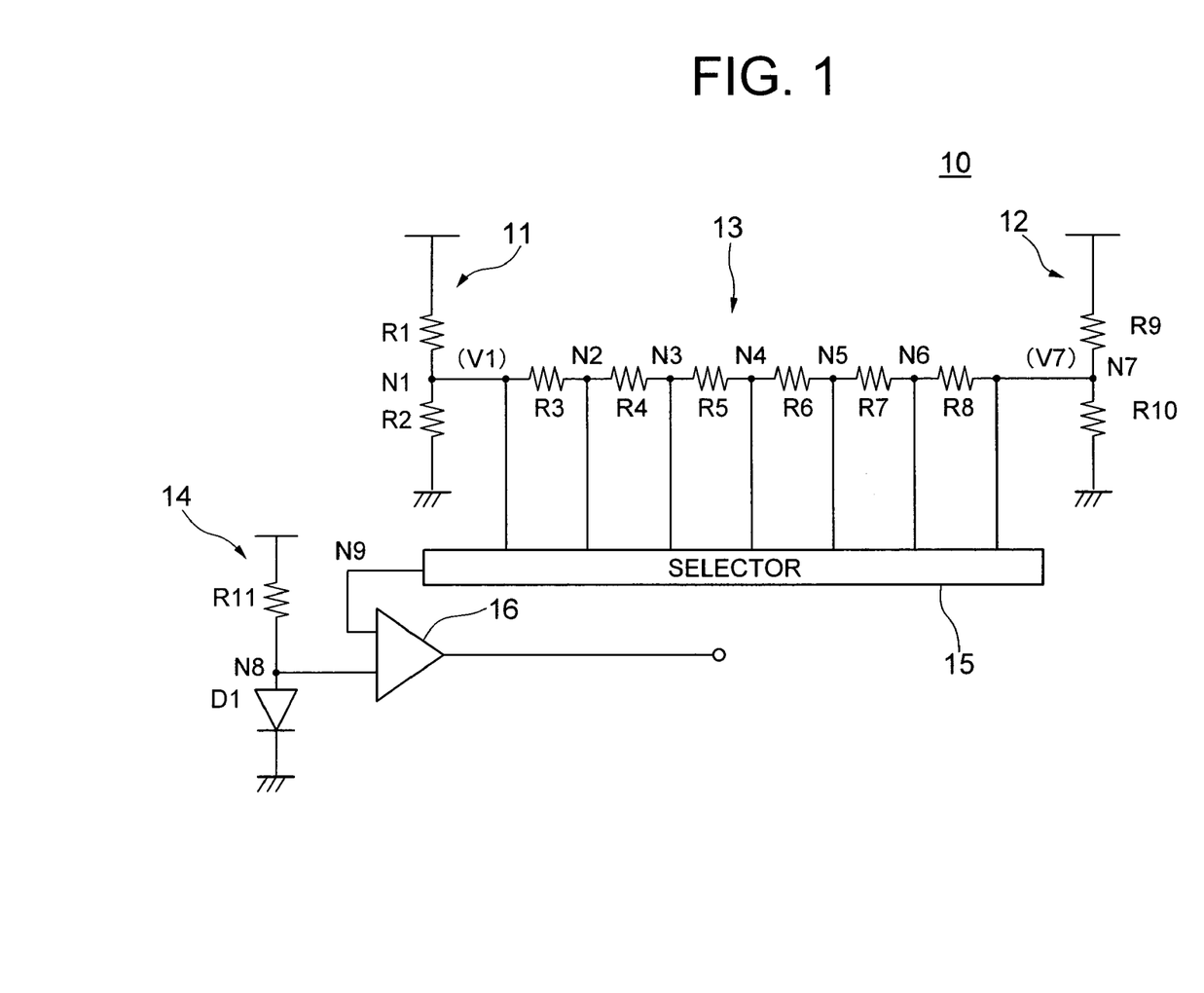
FIG. 1 is a circuit diagram showing the configuration of a temperature detection circuit according to a first embodiment of the present invention.

Now, embodiments of the present invention will be described in detail with reference to the accompanying drawings, wherein similar constituent elements are designated by similar reference numerals. FIG. 1 is a circuit diagram showing the configuration of a temperature detection circuit according to a first embodiment of the present invention. The temperature detection circuit, generally designated at numeral 10, includes a first reference-potential generator unit 11, a second reference-potential generator unit 12, an intermediate-potentials generator unit 13, a temperature-dependant-potential generator unit 14, a selector 15 and a comparator 16.

The first reference-potential generator unit 11 has a resistive voltage divider including resistors R1 and R2 connected in series between a high-potential power source line and a low-potential power source line, and outputs a first reference potential V1 through the node N1 connecting together the resistors R1 and R2. The second reference-potential generator unit 12 has a resistive voltage divider including resistors R9 and R10 connected in series between the high-potential power source line and the low-potential power source line, and outputs a second reference potential V7 through the node N7 connecting together the resistors R9 and R10.

The intermediate-potentials generator unit 13 has a resistive voltage divider including a plurality of resistors, i.e., six resistors R3 to R8 in the example of FIG. 1, connected in series between the node N1 of the first reference-potential generator unit 11 and the node N7 of the second reference-potential generator unit 12. The intermediate-potentials generator unit 13 divides the potential difference between the first reference potential V1 and the second reference potential V7 and outputs the divided potentials through the nodes N2 to N6 each connecting together adjacent two of the resistors R3 to R8.

For example, the node N3 connecting together the resistors R4 and R5 divides the potential difference |V1–V7| at a ratio of (R3+R4):(R3+R4+R5+R6+R7+R8), and outputs the following potential:

$$V1+\{(R3+R4)/(R3+R4+R5+R6+R7+R8)\times|V1-V7|\} \text{ (in case of } V1<V7\text{);}$$

or $$V7+\{(R5+R6+R7+R8)/(R3+R4+R5+R6+R7+R8)\times|V1-V7|\} \text{ (in case of } V7<V1\text{).}$$

The selector 15 receives the potentials of the nodes N1 to N7, and selects one of the potentials to output the selected potential based on the instruction issued from a control unit (not shown). In other words, the selector 15 selectively outputs the first reference potential V1 output from the first reference-potential generator unit 11, the second reference potential V7 output from the second reference-potential generator unit 12, or one of the plurality of intermediate-level potentials output by the intermediate-potentials generator unit 13. The temperature-dependant-potential generator unit 14 has a resistor R11 and a diode D1 connected in series between the high-potential power source line and the low-potential power source line, with the anode of the diode D1 being connected to the resistor R11 at a node N8, with the cathode of the diode D1 being connected to the low-potential power source line. Thus, the temperature-dependant-potential generator unit 14 outputs a voltage equal to the forward voltage drop $V_F$ of the diode D1 which varies depending on the ambient temperature.

The comparator 16 compares one of the potentials ($V_{N9}$) of the nodes N1 to N7 output from the selector 15 through the output node N9 thereof against the potential $V_{N8}$ of the node N8 output from the temperature-dependant-potential generator unit 14, and outputs the result of comparison indicating a level of the ambient temperature. If the potential $V_{N8}$ of the node N8 which varies depending on the ambient temperature is higher than the potential $V_{N9}$ of the node N9, the comparator 16 outputs a high level (H-level) signal. Alternatively, if the potential $V_{N8}$ of the node N8 exceeds the potential $V_{N9}$ of the node N9, the comparator 16 inverts the output thereof from a H-level to a L-level.

The resistance ratio between the resistors R1 and R2 of the resistive voltage divider in the first reference-potential generator unit 11 is adjusted based on the output potential of the temperature-dependant-potential generator unit 14 determined by the first specific temperature. Specifically, the resistor R1 is configured by a programmable resistor, and the potential of the node N1 is input to the comparator 16 via the selector 15 with the ambient temperature of the temperature detection circuit 10 being maintained at the first specific temperature. Then, the result of the comparison by the comparator 16 is monitored to thereby adjust the resistance of the resistor R1 by using a fuse-cutting technique etc. so that the potential of the node N1 becomes equal to the potential of the output node N8 of the temperature-dependant-potential generator unit 14.

The resistance ratio between the resistors R9 and R10 of the resistive voltage divider in the second reference-potential generator unit 12 is adjusted based on the output potential of the temperature-dependant-potential generator unit 14 at the second specific temperature. Specifically, the resistor R9 is also configured by a programmable resistor, and the potential of the node N7 is input to the comparator 16 via the selector 15 with the ambient temperature of the temperature detection circuit 10 being maintained at the second specific temperature. Then, the result of the comparison by the comparator 16 is monitored to thereby adjust the resistance of the resistor R9 so that the potential of the node N7 becomes equal to the potential of the output node N8 of the temperature-dependant-potential generator unit 14. In this process, if the resistance of the resistor R9 is adjusted after the adjustment of the resistor R1, the potential of the node N1 remains substantially unchanged by setting the resistance of the resistors R1, R2, R9 and R10 to be sufficiently lower compared to the resistance of the resistors R3 to R8.

Now, the present invention will be described with reference to a concrete example of the above embodiment. As the first and second specific temperatures in this example, temperatures of –10 degrees C. and 90 degrees C. are employed, respectively, which are generally used in the wafer test of semiconductor devices. The resistances of the resistors R1 to R10 are determined as follows. The sum (R1+R2) of the resistances of resistors R1 and R2 in the first reference-potential generator unit 11 and the sum (R9+R10) of resistances of the resistors R9 and R10 in the second reference-potential generator unit 12 are set at about 2 KΩ. Further, the resistance of the resistors R3 to R8 in the intermediate-potentials generator unit 13 is set at about 20 KΩ.

It is assumed here that the potential of the node N1 at an ambient temperature of –10 degrees C. is 0.6V and that VDD is 1.8 volts, R1 is set at 1.2 KΩ, and R2 at 0.6 KΩ. In this case, assuming that the potential of the node N7 at an ambient temperature of 90 degrees C. is 0.5 volts, the potential difference between the node N1 and the node N7 is 0.1 volts, the resistance between the node N1 and the node N7 amounts to 120 KΩ (20 KΩ×6), and the equivalent resistance of the node N1 as observed from the intermediate-potential generator unit 13 is 0.4 KΩ, which is calculated from the parallel connection of 1.2 KΩ (R1) and 0.6 KΩ (R2). As a result thereof, the potential change of the node N1 caused by the potential adjustment of the node N7 can be substantially neglected, because of the following potential change being encountered:

$$(0.4 \text{ K}\Omega/120 \text{ K}\Omega)\times 0.1\text{V}=0.00003 \text{ volts,}$$

which is only 0.3% of the above-described potential difference between the node N1 and the node N7. If even this change is not neglected for a specific case, the resistance of the resistors R3 to R8 may have a higher resistance.

Depending on the forward voltage drop of the diode D1, the potential $V_{N8}$ of the node N8 varies in relation to the ambient temperature as indicated by the following formula:

$$V_{N8} = -A \times T + B,$$

wherein A, B and T represent a proportionality constant, a constant, and the ambient temperature in the absolute temperature notation, respectively.

On the other hand, the potential of the node N1 after having been adjusted by the above adjustment, which is equal to the output potential V1 in the first reference-potential generator unit 11, corresponds to the potential of the node N8 at −10 degrees C. Thus, the output potential V1 is calculated from the following formula:

$$V1 = -A \times (273-10) + B \qquad (1).$$

Further, the potential of the node N7 after the adjustment, which is equal to the output potential V7 in the second reference-potential generator unit 12, is calculated from the following formula:

$$V7 = -A \times (273+90) + B \qquad (2).$$

If the selector 15 selects the node N5, the potential of the node N9 calculated from the following formula:

$$V_{N5} = V7 + (V1-V7) \times (2/6) \qquad (3)$$

is input to the comparator 16. Using the above-described formulas (1) and (2) and taking V1−V7=A×100 into consideration, the formula (3) is transformed into:

$$\begin{aligned} V_{N5} &= V7 + (V1-V7) \times (2/6) \\ &= V7 + A \times 100 \times (2/6) \\ &= \{-A \times (273+90) + B\} + A \times 100 \times (2/6) \\ &= -A \times [273 + 90 - \{100 \times (2/6)\}] + B \\ &= -A \times (273 + 56.66) + B. \end{aligned} \qquad (4)$$

The above-described formula (4) corresponds to the output potential of the temperature-dependant-potential generator unit 14 at 56.66 degrees C. Accordingly, the result of the comparison by the comparator 16 when the node N5 has been selected by the selector 15 indicates the result of the temperature detection at 56.66 degrees C. As described above, the correspondence between the nodes N2 to N6 of the intermediate-potentials generator unit 13 and the respective specific temperatures can be determined by the calculation based on the temperature difference between the first specific temperature and the second specific temperature and on the resistance ratio between the resistors R3 to R8. Thus, depending on the desired specific temperature, the resistance of the resistors R3 to R8 in the intermediate-potentials generator unit 13 are suitably set, and a node which has a potential corresponding to the desired specific temperature is selected by the selector 15. This allows any temperature between the first specific temperature (−10 degrees C.) and the second specific temperature (90 degrees C.) to be detected by the temperature detection circuit 10.

In the present embodiment, the potentials V1 and V7 output from the first and second reference-potential generator units 11 and 12, respectively, are detected at the ambient temperatures equal to the first and second specific temperatures, and the potential corresponding to a desired specific temperature therebetween is obtained by dividing the potential difference between the potential V1 corresponding to the first specific temperature and the potential V7 corresponding to the second specific temperature. In this manner, the reference potential corresponding to the intermediate specific temperature and input to the comparator 16 can be made substantially the same as the output potential of the temperature-dependant-potential generator unit 13 at the specific temperature to thereby detect the intermediate specific temperature accurately, without adjusting the output potential of the intermediated-potentials generator unit 13 while monitoring the output of the comparator 16 at the intermediate specific temperature. Further, in the present embodiment, a common comparator 16 can be used for a plurality of specific temperatures, and thus, even if there is an offset voltage involved with the comparator 16, adjustments incorporating the offset voltage are made at the first and second specific temperatures, thereby eliminating problems encountered by the offset voltage.

In the conventional temperature detection circuit, in order to improve the accuracy of temperature detection, it is necessary to make an adjustment of resistance ratio at each of desired specific temperatures. In addition, if it is desired to detect a larger number of specific temperatures, there arises a problem in the productivity rate of semiconductor devices which is degraded by the reason as described before. On the other hand, in the present embodiment, if it is desired to increase the number of desired specific temperatures, it is sufficient to increase only the number of the output nodes of the intermediate-potentials generator unit 13 and the number of the inputs of the selector 15 corresponding thereto. Thus, the productivity rate of semiconductor devices is not lowered even if a larger number of specific temperatures are to be detected. Further, by using temperatures generally used in typical temperature tests, such as low-temperature and high-temperature environmental tests for the wafers, as the first and second specific temperatures, adjustment of resistance ratio at any particular temperature is not needed for effecting the detection of the larger number of specific temperatures.

Figure 2:
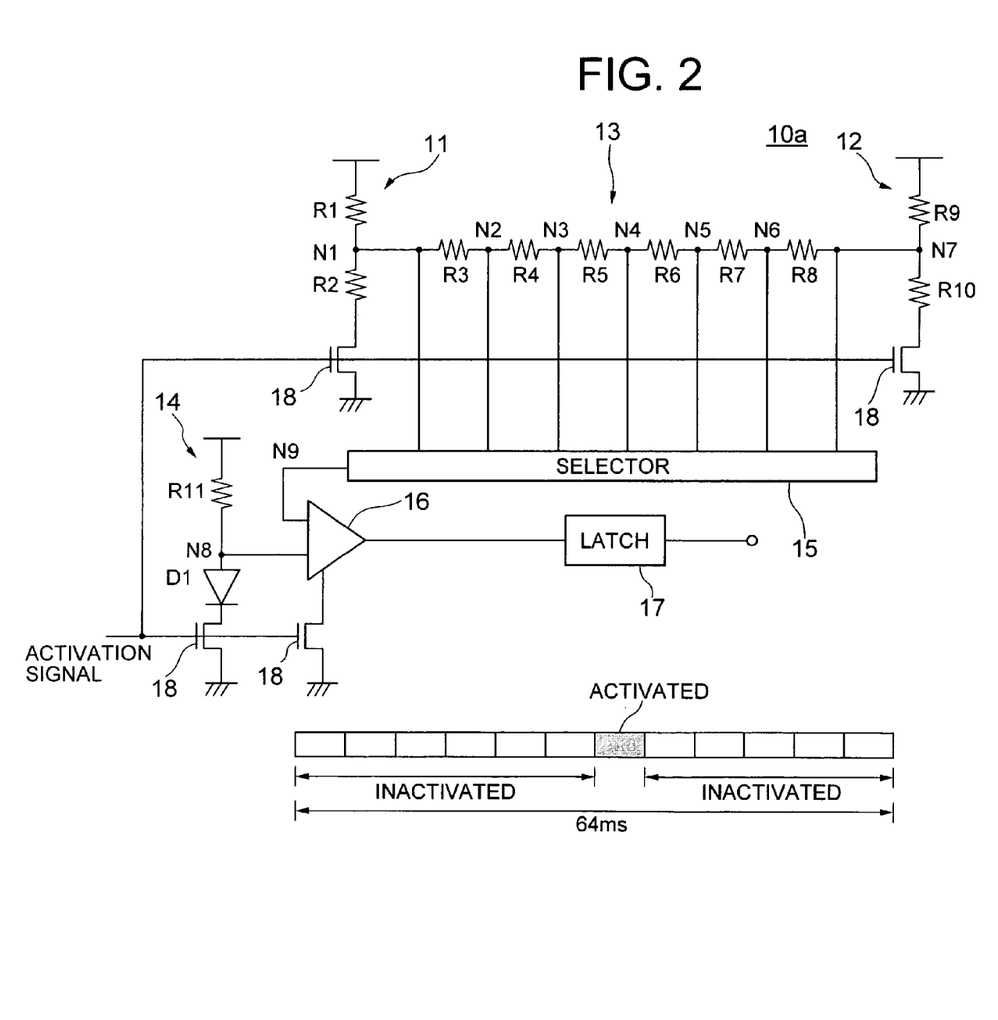
FIG. 2 is a circuit diagram showing the configuration of a temperature detection circuit according to a second embodiment of the present invention.

FIG. 2 is a circuit diagram showing the configuration of a temperature detection circuit according to a second embodiment of the present invention. The temperature detection circuit, generally designated at numeral 10a, according to the second embodiment of the present invention is similar to the temperature detection circuit 10 of the first embodiment except that the temperature detection circuit 10a additionally includes a latch circuit 17 and four power source control transistors 18. The power source control transistors 18 are connected in series between the resistor R2 of the first reference-potential generator unit 11 and the low-potential power source line, between the resistor R10 of the second reference-potential generator unit 12 and the low-potential power source line, between then cathode of the diode D1 of the temperature-dependant-potential generator unit 14 and the low-potential power source line, and between the low-potential power source line of the comparator 16 and the ground line, as shown in FIG. 2.

Each of the power source control transistors 18 is configured by an N-channel transistor and is controlled for ON/OFF thereof based on an activation signal input from the control unit (not shown) to the gate of the N-channel transistor 18. The control unit periodically activates the activation signal to assume a H-level, thereby turning ON the power source control transistors 18. When the activation signal is inactivated to assume a L-level, the power source control transistors 18 are turned OFF, and thus, each power source of the first and second reference-potential generator units 11 and 12, the temperature-dependant-potential generator unit 14 and the comparator 16 is disconnected, thereby reducing the operating current of the temperature detection circuit 10a. The latch circuit 17 latches the result of the comparison by the comparator 16 in the activated state of the temperature detection circuit and holds the result in the succeeding inactivated state thereof.

Assuming, for example, that the refresh cycle of a DRAM device including the temperature detection circuit of FIG. 2 is 8192 times (8k times) for a 64-millisecond (64-ms) operating time, the control unit shifts the mode of the temperature detection circuit 10a from an inactivated state into an activated state only once among the 8192 times. After having stored the result of the comparison in the latch circuit 17, the control unit inactivates the temperature detection circuit 10a. In such a case, the temperature detection is carried out only once for 8192 times of temperature detection, which fact does not result in an inaccuracy of the detected temperature because the ambient temperature of the temperature detection circuit 10a, i.e., the operating temperature of the DRAM is considered not to change significantly in the period of the 64 milliseconds. Further, the time period of the inactivated state of the temperature detection circuit 10a for detecting the ambient temperature is about 64 ms/8192, which is about 7.8 microseconds. This time period of the temperature detection is sufficient to stabilize operation of the temperature detection circuit 10a even if the resistors R3 to R8 in the intermediate-potentials generator unit 13 have a large resistance, whereby temperature detection circuit 10a outputs a reliable detected temperature.

In the present embodiment, as described above, the temperature detection circuit 10a is periodically activated by an activation signal, and the result of the comparison by the activated comparator 16 is stored in the latch circuit 17. Other circuits using the result of the temperature detection by the temperature detection circuit 10a can read the result of the comparison from the latch circuit 17 at any time, to use the result of the temperature detection. The inactivated state of the temperature detection circuit 10a reduces the dissipation current thereof.

Figure 3:
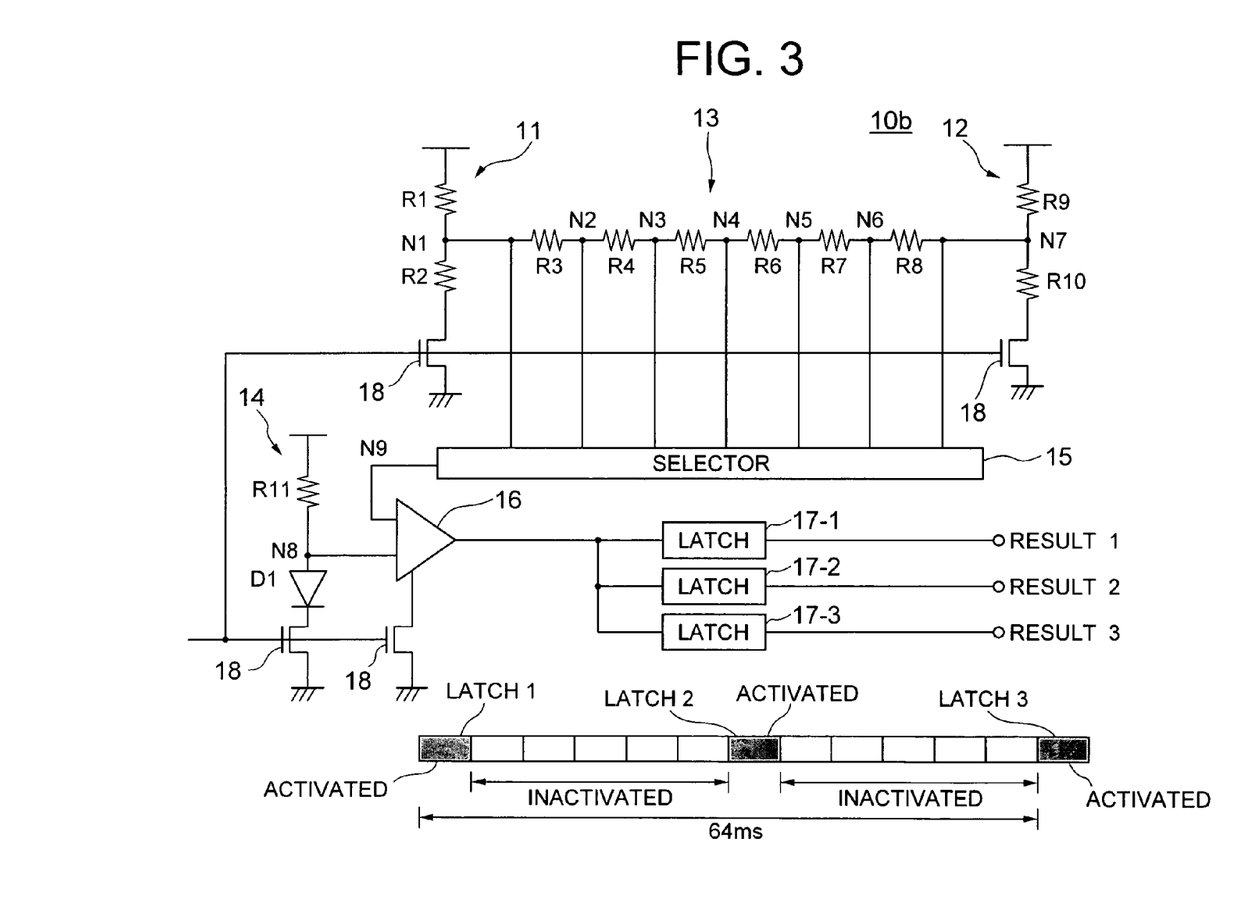
FIG. 3 is a circuit diagram showing the configuration of a temperature detection circuit according to a third embodiment of the present invention.

FIG. 3 is a circuit diagram showing the configuration of a temperature detection circuit according to a third embodiment of the present invention. The temperature detection circuit, generally designated at numeral 10b, of the present invention is similar to the temperature detection circuit 10a of the second embodiment except that the temperature detection circuit 10b includes three latch circuits 17-1, 17-2 and 17-3. In the present embodiment, the three latch circuits 17-1, 17-2 and 17-3 store the results of the comparison by the comparator 16 corresponding to three different specific temperatures. For example, the first latch circuit 17-1 latches the result of the comparison by the comparator 16 when the selector 15 has selected the node N2, the second latch circuit 17-2 latches the result of the comparison by the comparator 16 when the selector 15 has selected the node N4, and the third latch circuit 17-3 latches the result of the comparison by the comparator 16 when the selector 15 has selected the node N6.

For example, if the refresh cycle of a DRAM device including the temperature detection circuit 10b is 8192 times (8k times) for 64 milliseconds, the control unit (not shown) activates the temperature detection circuit 10b only three times among the 8192 times. For the first time among the three times, the control unit allows the selector 15 to select the node N2, and allows the first latch circuit 17-1 to latch the result of the comparison by the comparator 16. For the second time among the three times, the control unit allows the selector 15 to select the node N4, and allows the second latch circuit 17-2 to latch the result of the comparison by the comparator 16.

Similarly, for the third time among the three times, the control unit allows the selector 15 to select the node N6, and allows the third latch circuit 17-3 to latch the result of the comparison by the comparator 16.

It is assumed here, for example, that the node N2 corresponds to a specific temperature of 40 degrees C., the node N4 to a specific temperature of 60 degrees C., and the node N6 to a specific temperature of 80 degrees C. In this case, the first latch circuit 17-1 holds the result of the comparison indicating whether or not the temperature is above the first specific temperature, 40 degrees C., the second latch circuit 17-2 holds the result of the comparison indicating whether or not the temperature is above the second specific temperature, 60 degrees C., and the third latch circuit 17-3 holds the result of the comparison indicating whether or not the temperature is above the third specific temperature, 80 degrees C. By referencing to the result of the comparison held by these three latch circuits 17-1, 17-2 and 17-3, it can be determined whether the operating temperature is below 40 degrees C., in the range of 40 degrees C. to 60 degrees C., in the range of 60 degrees C. to 80 degrees C., or above 80 degrees C.

In the present embodiment, the result of the comparisons by the comparator 16 corresponding to a plurality of specific temperatures are held by a plurality of latch circuits 17. In this manner, other circuits using the result of the temperature detections of the temperature detection circuit 10b can recognize the range of the operating temperature of the DRAM, or the ambient temperature of the temperature detection circuit 10b. Further, a larger number of specific temperatures to be detected can be obtained by increasing the number of latch circuits in the temperature detection circuit, whereby the power dissipation thereof is not significantly increased for the larger number of the specific temperatures.

Figure 4:
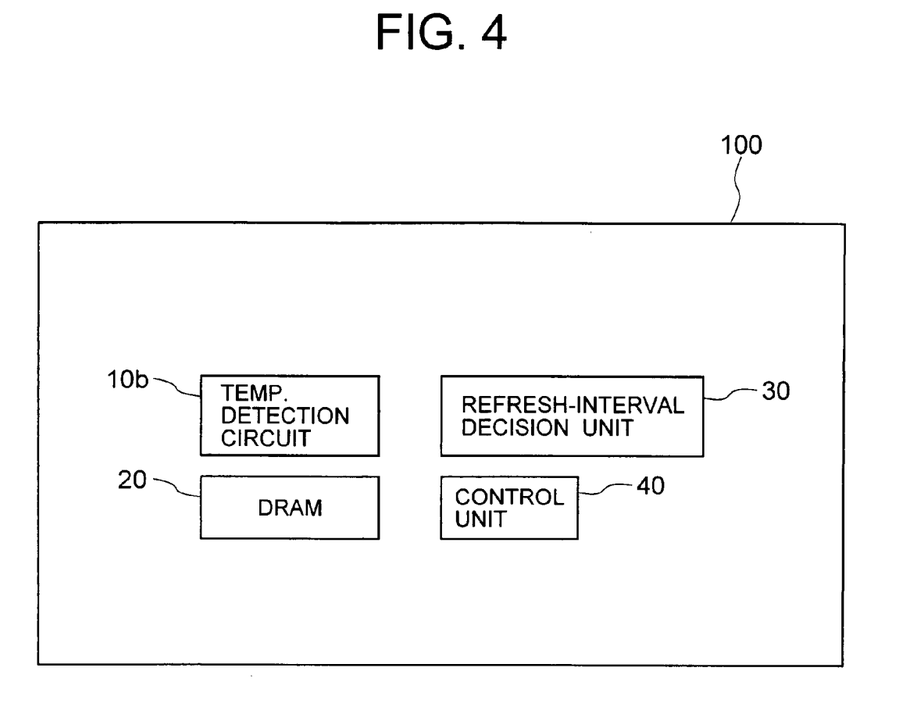
FIG. 4 is a block diagram showing the configuration of a semiconductor device including a temperature detection circuit according to an embodiment of the present invention.

FIG. 4 is a functional block diagram showing the configuration of a semiconductor device provided with the temperature detection circuit 10b of the third embodiment. This semiconductor device 100 includes the temperature detection circuit 10b, a DRAM 20, a refresh-interval decision unit 30 and a control unit 40. The control unit 40 controls each component of the semiconductor device 100. The refresh-interval decision unit 30 determines the refresh interval of the DRAM 20. The refresh-interval decision unit 30 changes the refresh interval based on an instruction issued from the control unit 40, the instruction depending on the operating temperature of the DRAM 20 detected by the temperature detection circuit 10b.

Figure 5:
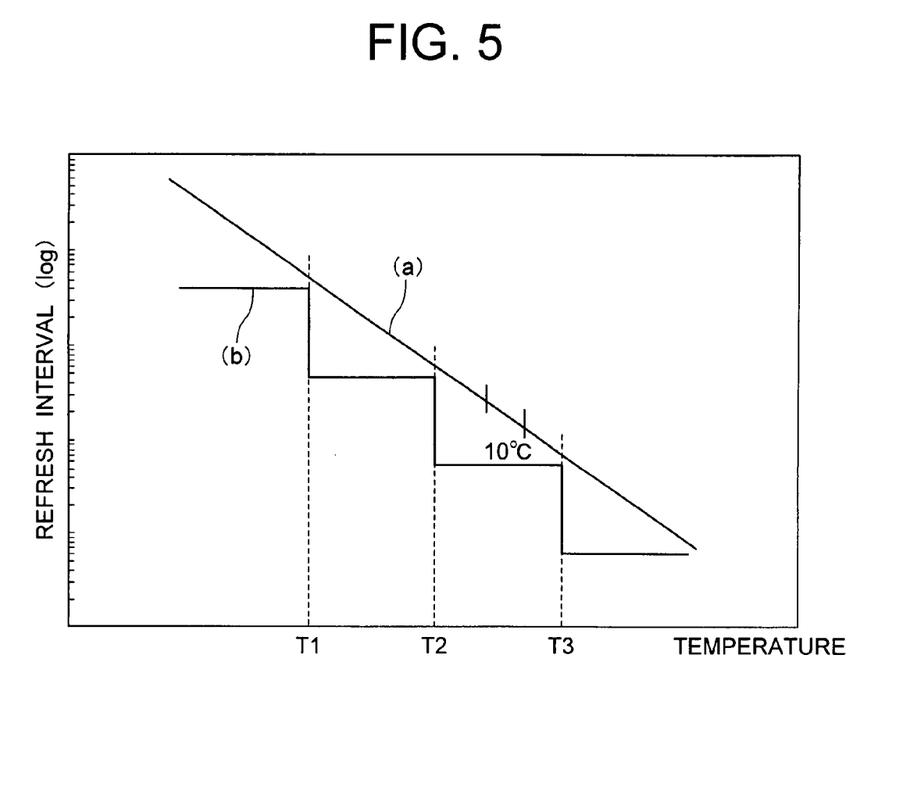
FIG. 5 is a graph showing the relationship between the operating temperature and the refresh cycle of a DRAM device.

FIG. 5 is a graph showing the relationship between the operating temperature of the DRAM and the refresh interval for the DRAM cells, wherein the operating temperature is plotted on abscissa and the refresh interval is plotted on ordinate in a logarithmic scale. In general, a lower operating temperature of the DRAM 20 requires a smaller number of refresh cycles or a larger refresh interval. As shown in the graph (a), if the temperature falls to 10 degrees C., a two times longer refresh interval is sufficient. The control unit 40 detects whether the operating temperature of the DRAM is below T1, in the range of T1 to T2, in the range of T2 to T3, or above T3, for example, by using the temperature detection circuit 10b. The control unit 40 controls the refresh interval, which is determined stepwise, for example, by the refresh-interval decision unit 30, as shown in the graph (b).

In general, an excessively short refresh interval should be avoided in a semiconductor device including a DRAM to thereby reduce the power dissipation. This can be achieved by changing the refresh interval depending on the operating temperature of the semiconductor device. However, the increase of the number of specific temperatures to be detected in the semiconductor device is likely to result in reduction of the productivity rate. Thus, the conventional semiconductor device has a smaller number of specific temperatures whereby the refresh interval cannot be controlled precisely depending on the detected temperature. In the temperature detection circuit 10b of the present embodiment, a larger number of specific temperatures to be detected can be provided without reduction of the productivity rate, incase of the circuit scale and increase of the power dissipation. Thus, in a semiconductor device including the temperature detection circuit 10b of the present embodiment, the refresh interval can be controlled precisely on the operating temperature of the semiconductor device or DRAM, thereby reducing the power dissipation without an increase in the circuit scale.

Figure 6:
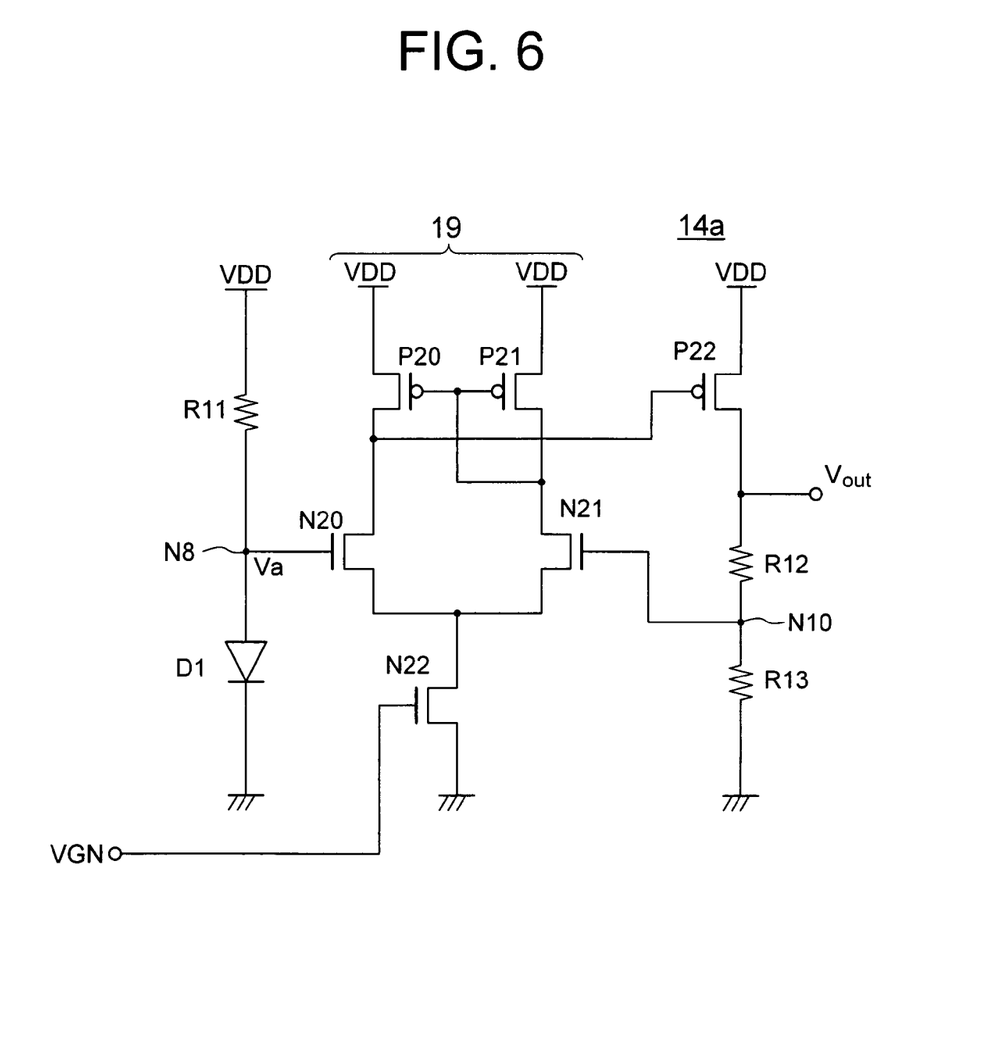
FIG. 6 is a circuit diagram showing a modification of the temperature-dependant-potential generator unit.

It is to be noted that although the potential of the node N8 connecting together the anode of the diode D1 and the resistor R11 is directly input to the comparator 16 in the above embodiment, the signal potential of the node N8 may be input to the comparator 16 after being amplified by an amplifier, taken into consideration that the forward voltage drop of the diode generally has a temperature dependency as low as about 2 millivolts per degree C. FIG. 6 shows the configuration of a temperature-dependant-potential generator unit including such an amplifier. More specifically, the temperature-dependant-potential generator unit 14a has a differential amplifier 19 configured by transistors P20, P21, N20, N21 and N22. The transistors P20, P21, N20 and N21 in combination configure a current mirror having a mirror ratio of 1:1.

The potential Va of the node N8 is supplied to the gate of the transistor N20 configuring the differential amplifier 19, and the potential of the node N10 is supplied to the gate of the transistor N21 and controlled to assume a potential equal to the potential Va of the node N8. Accordingly, the output $V_{out}$ of the temperature-dependant-potential generator unit 14a is expressed by the following formula:

$$V_{out} = \{(R12+R13)/R13\} \times Va.$$

The potential input to the comparator 16 is amplified to assume a voltage of (R12+R13)/R13 times of the potential Va of the node N8. By using the circuit configuration as described above, the temperature dependency of the output potential of the temperature-dependant-potential generator unit 14a can be increased.

Since the above embodiments are described only for examples, the present invention is not limited to the above embodiments and various modifications or alterations can be easily made therefrom by those skilled in the art without departing from the scope of the present invention.

What is claimed is:

1. A temperature detection circuit comprising:
a temperature-dependent potential generator for generating a temperature-dependent potential which varies depending on an ambient temperature;
a first reference-potential generator for generating a variable first reference potential;
a second reference-potential generator for generating a variable second reference potential;
an intermediate-potential generator for generating at least one intermediate potential provided between a central node of said first reference potential and a central node of said second reference potential;
a selector for selecting one of said first reference potential, said second reference potential and said intermediate potential to output a selected potential; and
a comparator for comparing said temperature-dependent potential against said selected potential to output a comparison result indicating a temperature level of the ambient temperature.

2. The temperature detection circuit according to claim 1, wherein said temperature-dependent potential generator includes a diode and a resistor connected in series between a high-potential power source line and a low-potential power source line.

3. The temperature detection circuit according to claim 2, wherein said temperature-dependent potential generator further includes an amplifier for amplifying the potential of a node connecting together said resistor and said diode.

4. The temperature detection circuit according to claim 1, wherein said first reference-potential generator includes a first resistive voltage divider for dividing a potential difference between a high-potential power source line and a low-potential power source line, and a dividing ratio of said first resistive voltage divider is adjusted based on an output of said temperature-dependent potential generator at a first specific temperature.

5. The temperature detection circuit according to claim 4, wherein said intermediate-potential generator includes a plurality of resistors each having a resistance equal to or higher than ten times a resistance of said first voltage divider.

6. The temperature detection circuit according to claim 1, wherein said second reference-potential generator includes a second resistive voltage divider for dividing a potential difference between said high-potential power source line and said low-potential power source line, and a dividing ratio of said second resistive voltage divider is adjusted based on an output of said temperature-dependent potential generator at a second specific temperature.

7. The temperature detection circuit according to claim 6, wherein said intermediate-potential generator includes a plurality of resistors each having a resistance equal to or higher than ten times a resistance of said second resistive voltage divider.

8. The temperature detection circuit according to claim 1, wherein said first reference-potential generator includes a first resistive voltage divider for dividing a potential difference between a high-potential power source line and a low-potential power source line.

9. The temperature detection circuit according to claim 8, wherein a dividing ratio of said first resistive voltage divider is adjusted based on an output of said temperature-dependent potential generator at a first specific temperature.

10. The temperature detection circuit according to claim 1, wherein said second reference-potential generator includes a second resistive voltage divider for dividing a potential difference between said high-potential power source line and said low-potential power source line.

11. The temperature detection circuit according to claim 10, wherein a dividing ratio of said second resistive voltage divider is adjusted based on an output of said temperature-dependent potential generator at a second specific temperature.

12. A semiconductor device including the temperature detection circuit according to claim 1 and an activation circuit for intermittently activating said temperature detection circuit; and wherein the temperature detection circuit monitors a temperature of the semiconductor device.

13. The semiconductor device according to claim 12, further comprising a latch circuit for latching an output of said comparator.

14. The semiconductor device according to claim 12, further comprising a specific number of latch circuits, the latch circuits configured to store associated results of the comparator for an associated specific number of specific temperatures, wherein said activating circuit periodically activates said temperature detection circuit for said specific number of times per a specific time interval.

15. The semiconductor device according to claim 12, further comprising a DRAM (dynamic random access memory), wherein the temperature detection circuit determines a temperature of the DRAM.

16. The semiconductor device according to claim 15, further comprising a refresh-interval generator unit for generating a refreshing interval signal based on the temperature level output from said temperature detection circuit, said refreshing interval signal defining a refreshing interval of said DRAM.

17. A semiconductor device including a temperature detection circuit, the semiconductor device comprising:
- a temperature-dependent potential generator provided in the temperature detection circuit configured to generate a temperature-dependent potential which varies depending on an ambient temperature;
- a first reference-potential generator provided in the temperature detection circuit configured to generate a first reference potential;
- a second reference-potential generator provided in the temperature detection circuit configured to generate a second reference potential;
- an intermediate-potential generator provided in the temperature detection circuit configured to generate at least one intermediate potential provided between a central node of the first reference potential and a central node of the second reference potential;
- a selector provided in the temperature detection circuit configured to select one of the first reference potential, second reference potential and intermediate potential to output a selected potential;
- a comparator provided in the temperature detection circuit configured to compare the temperature-dependent potential against the selected potential to output a comparison result indicating a temperature level of the ambient temperature; and
- an activation circuit configured to intermittently activate the temperature detection circuit.

18. The semiconductor device of claim 17, wherein the activation circuit activates the temperature detection circuit once per predetermined operating cycle.

19. The semiconductor device of claim 18, further comprising:
- a first power source control transistor being provided between the first reference-potential generator and a ground;
- a second power source control transistor being provided between the second reference-potential generator and a ground;
- a third power source control transistor being provided between the temperature-dependent potential generator and a ground; and
- a fourth power source control transistor being provided between the comparator and a ground,
wherein when the first, second, third, and fourth power control transistors are disconnected, the temperature detection circuit is inactive and when the first, second, third, and fourth power control transistors are connected, the temperature detection circuit is active.

20. The semiconductor device of claim 17, further comprising a control unit, wherein the control unit detects an operating temperature of a DRAM (dynamic random access memory) included in the semiconductor device, the control unit being configured to determine a stepwise refresh interval based on the operating temperature of the DRAM based on at least one temperature operating range.

21. The semiconductor device of claim 20, further comprising a latch device configured to latch a result of a comparison by the comparator in the active state of the temperature detection circuit and the latch device stores the result in the inactive state of the temperature detection circuit.

* * * * *